O. H. STAIR.
SPINDLE LUBRICATOR.
APPLICATION FILED SEPT. 15, 1916.
1,252,191. Patented Jan. 1, 1918.
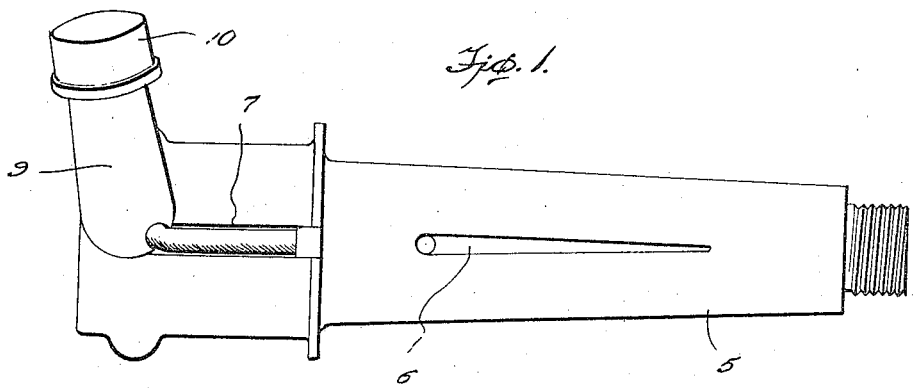
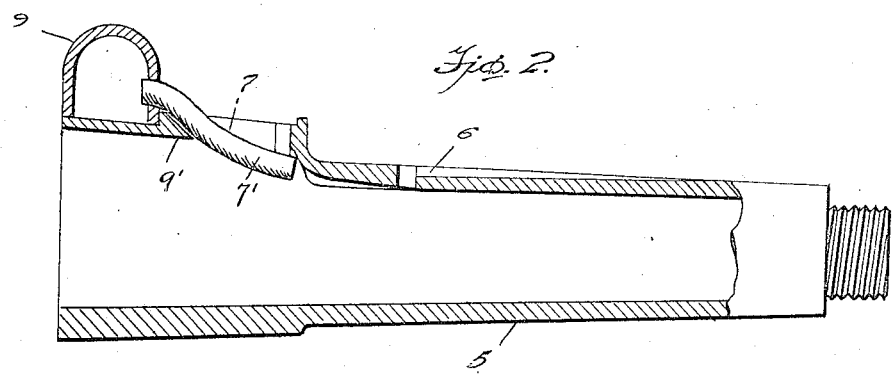
Witness
P. M. Hunt
N. A. Minnett
Inventor
O. H. Stair.
By John Louis Waters
Attorney

UNITED STATES PATENT OFFICE.

OSCAR H. STAIR, OF FLATONIA, TEXAS.

SPINDLE-LUBRICATOR.

1,252,191.  Specification of Letters Patent.  Patented Jan. 1, 1918.

Application filed September 15, 1916. Serial No. 120,306.

*To all whom it may concern:*

Be it known that I, OSCAR H. STAIR, a citizen of the United States, residing at Flatonia, in the county of Fayette and State of Texas, have invented certain useful Improvements in Spindle-Lubricators, of which the following is a specification, reference being had therein to the accompanying drawing.

This invention relates to improvements in lubricating spindles, one object of the invention being the provision of a spindle in which the lubricant may be supplied thereto without removing the wheel.

A further object of this invention is the provision of a device of this character which is simple, durable and inexpensive in construction and which is thoroughly efficient and practical in use.

In the accompanying drawings:

Figure 1 is a top plan view of my invention showing the spindle as well as the oil receptacle to be described, and Fig. 2 is a partly sectional view of Fig. 1 showing the oil receptacle.

Referring to the drawings, which are merely illustrative of my invention, 5 designates a spindle which is formed with an outer longitudinal groove 6 and has an oil-receiving receptacle 9 mounted thereupon in back of said groove. A removable cap 10 is secured to the outer end of said receptacle. The spindle 5 is formed with an integral ledge 9' having an inclined outer wall. The spindle 5 is formed in advance of said receptacle with an elongated slot 7, and said spindle also has an opening extending through the bottom of the groove in a manner to communicate with said slot. A flexible tube 7' is adapted to rest upon the inclined wall of said ledge and has one end thereof projecting into said receptacle 9 its opposite end projecting into said slot 7. The oil is fed from the receptacle 9 through the flexible tube 7' whence it is carried into the slot and finds its way to the opening in the groove 6 so as to fill this groove with a suitable amount of oil.

Numerous modifications may be resorted to in practice without departing in principle from the details of construction disclosed herein.

What I claim as new is:

In a device of the class described, a spindle formed with an outer longitudinal groove, an oil receiving receptacle carried by said spindle, a cap removably secured to the outer end of said receptacle, a ledge formed integrally upon said spindle and having an inclined outer wall, said spindle being formed in advance of said receptacle with an elongated slot, said spindle having an opening extending through the bottom of said groove so as to communicate with said slot, and a flexible tube resting upon the inclined wall of said ledge and having one end projecting into said receptacle and its opposite end projecting into said slot.

In testimony whereof I affix my signature.

OSCAR H. STAIR.